United States Patent

Peppiatt et al.

[11] Patent Number: 5,482,296
[45] Date of Patent: Jan. 9, 1996

[54] SEALING RINGS AND SEALED ASSEMBLIES

[75] Inventors: Nicholas A. Peppiatt, Lightwater, England; Willibald Nentwig, Seevetal, Germany

[73] Assignee: Hallite Seals International Limited, Middlesex, Great Britain

[21] Appl. No.: 124,709

[22] Filed: Sep. 21, 1993

[30] Foreign Application Priority Data

Sep. 22, 1992 [GB] United Kingdom ............... 9219963
Aug. 19, 1993 [GB] United Kingdom ............... 9317228

[51] Int. Cl.$^6$ ............................................. F16J 15/32
[52] U.S. Cl. ........................... 277/24; 277/136; 277/205
[58] Field of Search ........................ 277/6, 8, 24, 136, 277/205, 152

[56] References Cited

U.S. PATENT DOCUMENTS

| | | | |
|---|---|---|---|
| 2,105,777 | 1/1938 | Smith, Sr. | 277/136 |
| 2,907,596 | 10/1959 | Maha | 277/188 R |
| 3,320,824 | 5/1967 | Riley, Jr. et al. | 277/8 |
| 3,447,819 | 6/1969 | Borsum et al. | 277/205 |
| 3,540,742 | 11/1970 | Tracy | 277/136 |
| 3,892,418 | 7/1975 | Felt | 277/205 |
| 4,379,558 | 4/1983 | Pippert | 277/188 A |
| 4,407,511 | 10/1983 | Benton et al. | 277/24 |
| 4,438,935 | 3/1984 | Lees | 277/205 |
| 4,856,794 | 8/1989 | Boyers et al. | 277/136 X |
| 5,056,799 | 10/1991 | Takenaka et al. | 277/205 X |

FOREIGN PATENT DOCUMENTS

| | | | |
|---|---|---|---|
| 0025883 | 5/1907 | Sweden | 277/136 |
| 0644017 | 10/1950 | United Kingdom | 277/136 |
| 1472925 | 4/1974 | United Kingdom . | |
| 2102898 | 7/1982 | United Kingdom . | |

OTHER PUBLICATIONS

"Seals and Sealing Handbook", 3rd Ed. Elsevier, 1990, pp. 213–215.
"Hallite Type 605 Rod Seals", Adv. p. 27.
"Hallite Type 601 Rod Seals", Adv. p. 21.
"Hallite High Performance Hydraulic Sealing Systems", Adv. Apr. 1992.

Primary Examiner—William A. Cuchlinski, Jr.
Assistant Examiner—John L. Beres
Attorney, Agent, or Firm—Fay, Sharpe, Beall, Fagan, Minnich & McKee

[57] ABSTRACT

A sealing ring for sealing between opposed surfaces of a bore and a rod extending axially in the bore has a recess, preferably in the form of a narrow axially-opening annular slot, behind one or more sealing lips thereof. The dimensions of the recess are selected so that its opposed radial faces are squeezed together in the installed condition of the seal, giving a positive radial squeeze of seal material behind the sealing lips. The positive squeeze enables a stronger sealing force to be achieved, while the presence of the recess reduces overall radial compression force and hence avoids excessive friction.

16 Claims, 3 Drawing Sheets

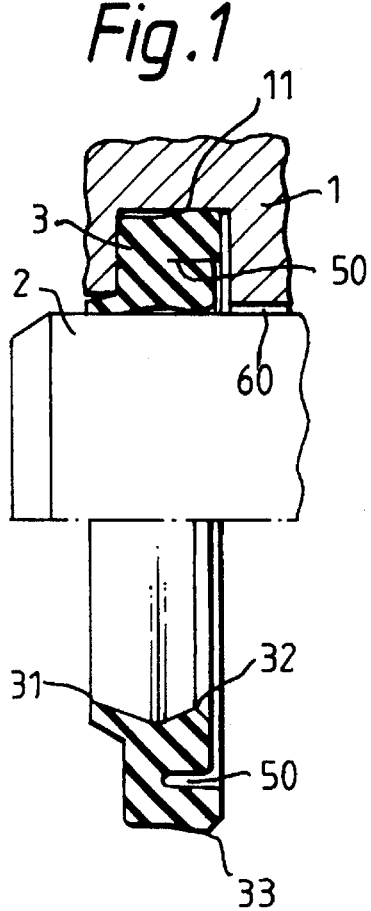
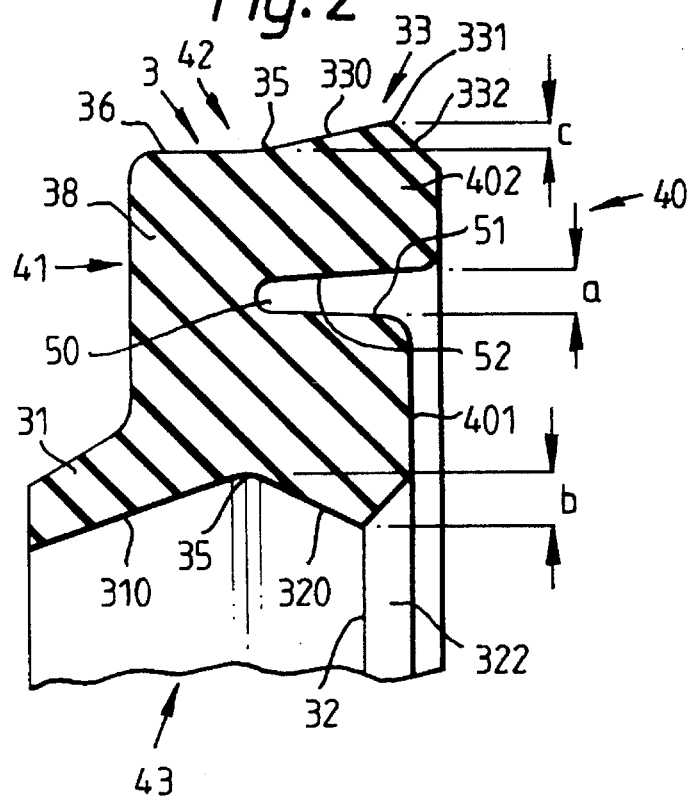
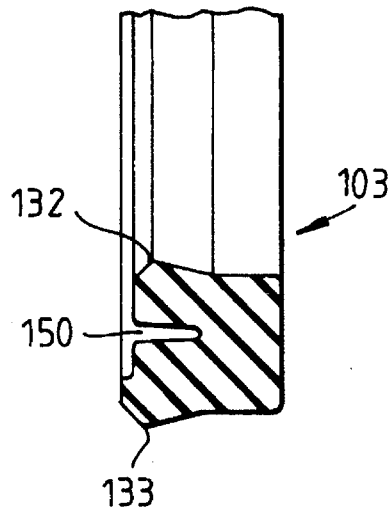

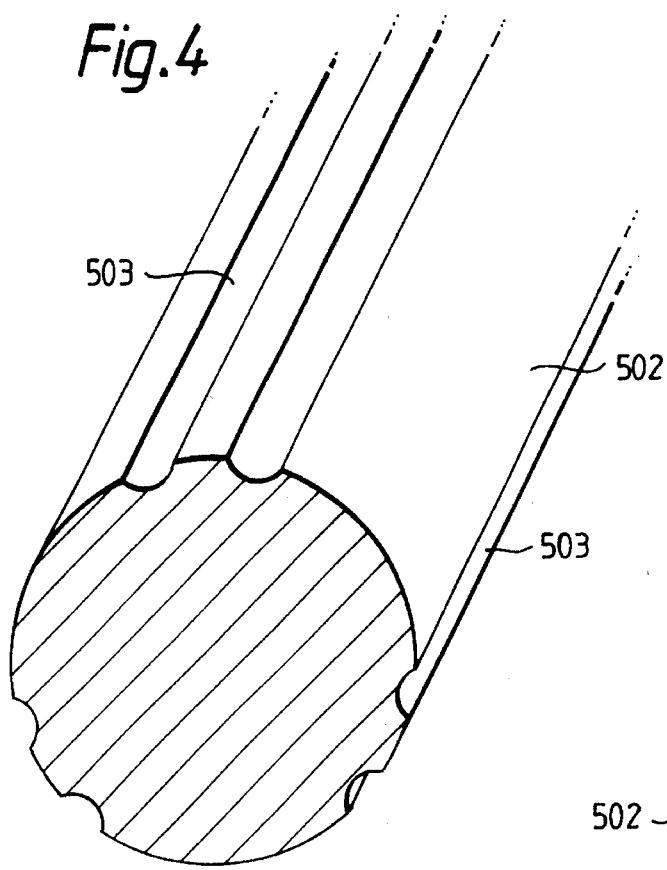
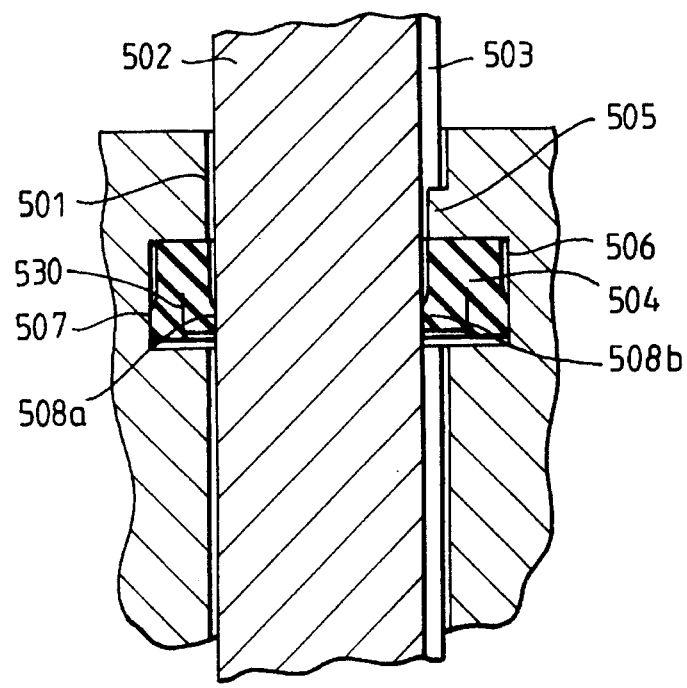

SEALING RINGS AND SEALED ASSEMBLIES

FIELD OF THE INVENTION

This invention relates to sealing rings and sealed assemblies. In particular it is concerned with sealing rings for sealing around rods in bores where the rod and bore are relatively axially movable, e.g. as in hydraulic and pneumatic cylinders. In other aspects, the invention relates to the hydraulically or pneumatically operable piston-cylinder assemblies themselves with the sealing rings installed therein.

BACKGROUND OF THE INVENTION

Sealing rings of this type are typically seated in an annular recess of the bore wall, sealing with a radially-inwardly directed sealing lip against an axially-smooth surface of a rod. This is called a "rod seal". However, the invention is also relevant to "piston seals", i.e. a situation in which the sealing ring is seated in an annular recess of the rod, sealing with a radially-outwardly directed sealing lip against an axially-smooth surface of the bore.

The present concept is particularly concerned with single-acting sealing rings, i.e. for handling high pressure from one axial direction only and therefore having in effect a high-pressure side and a low-pressure side. However the invention may have some application with sealing rings in other contexts.

A conventional single-acting sealing ring is a one-piece elastomeric unit having, on the low-pressure axial side, a continuous solid support or body portion and, on the high-pressure axial side, a divergence created by an axially-opening channel extending around the ring and separating radially-inwardly and radially-outwardly facing sealing lips, which project radially beyond the support or body portion. This description refers to the free (pre-installation) condition of the sealing ring. In the-installed condition, the support portion or body need not make contact. Under high-pressure conditions it may sometimes contact the sealed surfaces, but with a lower pressure than the sealing lip and hence without significant sealing function.

The axially-open channel between the sealing lips (or behind the sealing lip, if there is only one) is typically exposed to the fluid pressure on the high-pressure side to assist urging the sealing lip into good sealing engagement.

Another known type of sealing ring has the channel occupied by an insert with very high elasticity which "energises" the sealing lip to some extent, irrespective of the pressure conditions.

Another conventional type of seal is the solid-section or "O-ring" seal, essentially a solid annulus. These seals have the drawback that in some circumstances, the compression required to achieve a desirable degree of sealing results in an undesirably large frictional force.

SUMMARY OF THE INVENTION

The aim of the present invention is to provide a novel type of sealing ring and sealed rod-bore installation, particularly with a view to achieving a high sealing force but with less friction and installation loading than the known "O-ring" type of seal.

In general terms, we use a sealing ring having a sealing lip extending around it and With a recess in the material of the ring behind, i.e. in axial alignment with, the sealing lip, the recess having opposed inwardly and outwardly radially-directed faces which are spaced apart in the free condition of the seal but pressed together in the installed condition of the seal to give a "positive squeeze" in the installed condition, that is, a continuity of compressed seal material between the opposed sealed surfaces at the lip.

By this means, the benefits of a "positive squeeze" are achieved, namely a substantial and self-energising seal force, but with a reduced installation force and modest friction because the radial compression of the ring involved in installation does not radially compress the full volume of rubber until the opposed faces of the recess meet.

In one specific aspect, the invention provides a sealing ring having a radially-directed face with a sealing lip projecting radially relative to an adjacent non-lip region by a distance which may be termed the sealing lip projection. There may typically be a sealing lip also on the oppositely radially-directed face of the sealing ring as well. A recess in the sealing ring body extends around behind i.e in axial alignment with, the sealing lip(s). The sealing lip projection, or total sealing lip projection if there are two opposite sealing lips, is greater than the radial width of the recess. This enables the recess to be closed radially when the sealing ring is compressed radially from the free condition to the working condition.

Alternatively stated, in another aspect, a sealing ring of the invention is radially compressible between opposed concentric cylindrical surfaces so as to press together radially-opposed faces of an internal body recess extending around behind the sealing lip(s), without compressing the radially-facing surfaces of the sealing ring into full-face contact with both of said cylindrical surfaces. This definition expresses the function of the sealing ring in an operational context, by way of a simple test.

In a further aspect, the invention provides a sealed assembly in which a radially-compressed elastomeric sealing ring seals between surfaces of a rod and a bore, the sealing ring having an annular sealing lip sealing against a said surface and an internal recess extending in the body of the sealing ring behind (i.e. in axial alignment with) the sealing lip, the internal recess being pressed shut by the radial compression; this creates positive squeeze of the ring material behind the sealing lip and gives enhanced sealing force.

In a further aspect, the invention provides a method of sealing between a rod and a bore in which a sealing ring, having in its free condition an open internal body recess, is fitted between the rod and bore surfaces to give an installed condition in which radial compression presses opposed radially-directed internal surfaces of the recess radially against one another.

The special recess of the seal is preferably open at one side, most preferably open at an axially-directed face of the ring, so that it closes easily. In many sealing rings sealing lip(s) is/are nearer to one axial side of the ring than the other; the recess may then conveniently open at that axial side, extending axially into the body of the seal behind the lip(s).

The recess may be of substantially uniform cross-sectional shape around the ring e.g. a continuous uniform channel.

The axial extent of the recess should be sufficient to provide for a significant compression force reduction behind the sealing lip(s), without jeopardising the integrity or working stability of the ring. It may however vary in dependence on the type and shape of ring involved. A typical sealing lip is the extremity of a taper or divergence of the ring surface from a supporting or body level, on one or both axial sides of the sealing lip. A support or body portion is typically solid-section. In this case, the recess preferably extends behind at least 50%, more preferably behind at least 80% of the axial extent of the outward taper or divergence, and desirably has substantially the same axial extent.

As explained, the recess must close radially in the installed condition of the ring, and for stability is therefore desirably radially narrow compared with its axial extent. Usually, its axial extent is at least twice its radial width (mean width, if the width varies). Using the above-mentioned comparison with a "total sealing lip projection", the radial width is usually less than 80%, more usually less than 70% of the total lip projection in order to give significant positive squeeze. Conversely, the radial width is usually at least 30% and more usually at least 40% of the total lip projection, to give a significant reduction in the installation force involved in compressing the ring.

The "sealing lip projection" needs to be determined in a way appropriate to a given shape of seal. Normally, it is the greatest distance by which a sealing lip projects radially beyond axially-adjacent non-lip parts of the same face of the ring. In the usual case in which an adjacent taper or divergence leads from the adjacent portion to the lip extremity, the projection can be taken as the radial extent of that taper or divergence.

As to its shape, the radially-opposed faces of the recess are preferably generally straight (in section) i.e. cylindrical or conical. They are also preferably substantially complementary. So, a slot with substantially parallel walls is suitable.

The invention may be used with piston or rod seals. It may be used with a main seal, or in an auxiliary seal e.g. for the inner (pressure side) sealing on a wiper seal.

In one particular aspect we address a new problem, namely a situation in which one or both surfaces to be sealed against is not a smooth single curve. A specific instance is envisaged where it is desired to prevent rotation of a rod around its axis in the bore e.g. where the rod carries at its end a tool whose rotational alignment must be maintained. For example, the rod might be a fluid-operated robot arm. The relative rotation might be prevented e.g. by using two cylinders side by side, and coupling their rods together at the free end. That is awkward and bulky. A simpler solution envisaged is to provide axially-extending local recesses in the surface of either the rod or the bore—preferably the rod for convenience—which can be engaged by corresponding projections on the other part.

However, the problem of how to achieve effective fluid sealing, between a smoothly curved surface and a recessed e.g. grooved surface, is a serious one.

We have found that a surprisingly effective sealing can be achieved by using the present concept, namely by (1) providing the sealing ring with circumferentially-localised projections corresponding to the recesses grooves, to be sealed, and (2) providing the body of the seal behind the sealing lip(s) with a recess—a channel or slot—which is open in the free condition of the ring, but closes behind the projections when the seal is installed so that its sides are squeezed together, urging the projections positively into the recesses to be sealed.

The way in which this gives effective sealing at a discontinuous corner e.g. the edge of a groove, is difficult to explain. But, it can be said that the presence of the slot or channel provides the substantial dimensional flexibility required to achieve effective sealing, while when closed giving the extra positive squeeze that is needed for the difficult sealing of the irregular surface, without causing excess very high friction overall.

Specifically, this aspect of the invention provides a sealing ring having a radially-directed sealing face with a sealing lip, at least one circumferentially localised radial projection of the sealing lips, and a channel extending circumferentially around the seal behind the sealing lip and which is positively squeezed shut, at least behind the radial projection(s), when the sealing ring seals between a rod and bore in use, with the or each projection sealing in a corresponding surface recess.

In a corresponding assembly aspect we provide a fluid-drivable cylinder assembly in which one or more radial projections, fixed relative to a cylinder bore, engage one or more respective axially-extending surface grooves of a piston rod which is axially slidable in the bore, to prevent relative rotation between the two, and in which a sealing ring seated in an annular recess of the bore seals against the grooved outer surface of the rod with a sealing face having a sealing lip, one or more respective radial projections for fitting sealingly into the one or more grooves of the rod surface, and a channel or slot in the seal behind the radial projection(s) thereof and which is radially closed by the compression of the seal between the rod and bore.

The sealing ring may have any of the preferred features mentioned above. The rod may carry a tool or manipulating device, e.g. as part of a fluid-operated robot arm.

BRIEF DESCRIPTION OF THE DRAWINGS

Embodiments are now described by way of example, with reference to the drawings in which:

FIG. 1 is a diametrical and axial cross-section of a wiper seal assembly, showing the installed condition at the top and the free condition at the bottom;

FIG. 2 is an enlarged cross-section of the FIG. 1 sealing ring in its free condition as manufactured;

FIG. 3 is a corresponding cross-section showing the concept applied to a main rod seal;

FIG. 4 shows a grooved piston rod;

FIG. 5 is an axial section showing the piston rod mounted in a cylinder bore and sealed by a sealing ring;

DETAILED DESCRIPTION OF THE PREFERRED EMBODIMENTS

Figure 6:
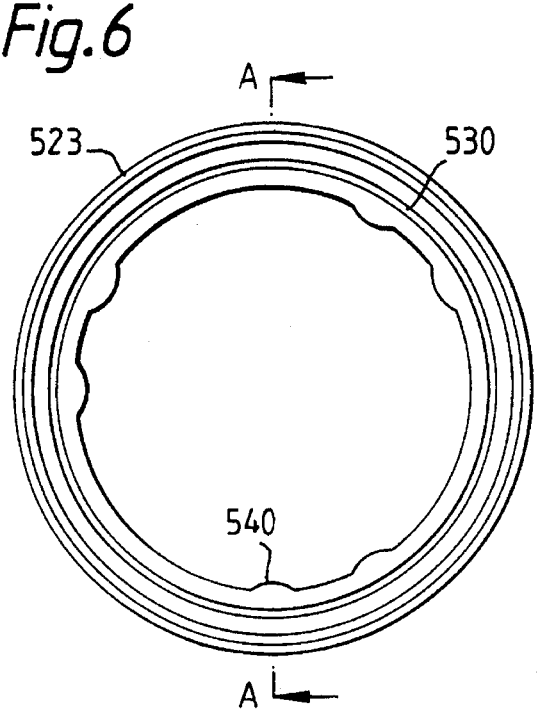
FIG. 6 is an axial view of the sealing ring.
Figure 7:
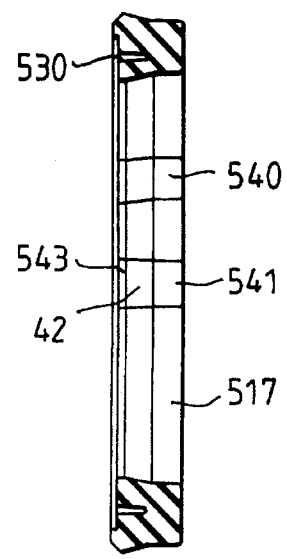
FIG. 7 is a radial section of the sealing ring at A—A of FIG. 6.

FIG. 1 shows a wiper seal arrangement which in practice operates in conjunction with a main rod seal, not shown, for a hydraulic piston/cylinder. Such an arrangement is per se well-known; the wiper seal 3 has a conventional outward wiper lip 31 to prevent entry of dirt, and radially inner and outer hydraulic sealing lips 32,33 on the pressure side, to prevent escape of hydraulic fluid. In a manner conventional per se, the sealing ring 3 sits in an annular recess 11 of the cylinder wall 1, with the radially inner sealing lips 31,32 bearing against the surface of the rod 2 across a small clearance.

Referring now also to FIG. 2, the sealing ring 3 in its free condition is an annulus of elastomer, e.g. conventional nitrile rubber or polyurethane, of generally rectangular four-sided cross-section with an axially directed face 40 (high-pressure side) towards the fluid pressure, an oppositely axially-directed face 41 (low-pressure side), a radially-outwardly-directed face 42 (outer sealing face) having the outward sealing lip 33 bearing against the cylindrical outer wall of the bore recess 11, and a radially-inwardly-directed face 43 (inner sealing face) having the wiper lip 31 and the inward hydraulic sealing lip 32 which press against the rod 2.

On the inner sealing face 43 each of the lips 31,32 is a sharp annular edge approached by a respective main conical taper 310,320 radially inwardly from a central waist 35, the radially narrowest part of the seal body.

The low-pressure side 41 is flat and seats against the corresponding flat axially-facing wall of the bore recess 11; the wiper lip 31 projects at its radially inner edge.

The outer sealing face 42 has a plain cylindrical surface 36 at the low-pressure side, defining the outer part of a generally rectangular-section solid support body portion 38 of the sealing ring, in relation to which the various functional sealing parts can be regarded as projecting. At the high-pressure side the outer hydraulic lip 33 is defined by a radially-outward conical taper 330 from the edge of the cylindrical non-lip body surface 36 (corresponding to the central waist 35), leading to a sharp extremity 331 and an axially-short secondary taper 332 to the pressure side 40. The inner hydraulic lip 32 has a corresponding secondary taper The inner and outer hydraulic lips 32,33 are substantially opposite i.e. in axial register.

The pressure side 40 has a radially-inner region 401 and a radially-outer region 402, separated by an annular slot 50. The inner and outer regions 401,402 are slightly axially stepped. This is known, to improve fluid pressure "energising" of the sealing lips 32,33.

The annular slot 50 extends axially about half-way through the body 38 of the ring; this is substantially as far as the waist 35 where the tapers 320,330 of the sealing lips 33,32 commence. In section, its opposed internal faces 51,52 are substantially straight and axial, so that it is a substantially cylindrical slot. In fact, there is a very slight outward divergence of its opposed faces to facilitate withdrawal of a mould portion used to form the slot 50 when the ring is moulded.

The slot 50 is about three times as deep (axially) as wide (radially), and radially substantially narrower than either of the pressure side face regions 401, 402. Considering this in more detail, the mean radial width "a" of the slot is about 85% of the projection "b" of the inner hydraulic lip 32 and about 60% of the total projection "b+c" of the two hydraulic lips 32,33. For example, a ring 3 of about 60 mm diameter has a radial body thickness (of the "waist") of about 5 mm, outer and inner hydraulic lip projections of about 0.4 mm and 0.9 mm respectively, closable slot width of about 0.8 mm and slot depth of about 2.8 mm.

As seen in FIG. 1, this relative narrowness of the slot 50 enables the installed sealing ring to reach a conventional degree of radial compression of the sealing lips 32,33 without necessarily bringing the inner and outer radially-directed faces 42,43 of the ring into full all-over contact with the opposing metal (which would create high friction), at the same time squeezing shut the slot 50 and thereby achieving a positive squeeze of rubber behind the hydraulic sealing lips 32,33.

In the context of a wiper seal, this has a particular value. It is possible for fluid to become trapped under very high pressure in the space (60, FIG. 1) between the wiper seal and the main seal. This trapped pressure can sometimes blow a conventional wiper out of its housing recess. With the positive squeeze provided by the present ring, the trapped pressure that can be withstood before "blow-out" is markedly increased. At the same time, the compression force reduction allowed by the presence of the closeable slot 50 makes installation simple and keeps down friction.

As mentioned, however, the concept is not limited to this particular kind of ring. It has use in many structures where a "positive squeeze" seal can bring advantages. FIG. 3 shows a corresponding construction applied to a main rod seal 103, with axially-aligned inner and outer hydraulic lips 132,133 and the closeable slot 150 between.

The radial positioning of the slot may be varied. Generally, it will be in the central 50% of the radial width of the pressure face. In the wiper seal shown in FIGS. 1 and 2 it is well clear of the inner lip 32 to reduce the likelihood of extrusion damage if high pressure is trapped.

FIGS. 4 to 9 illustrate the concept in application to the special case of a grooved rod, where it has been found to have another special and unforeseen utility.

FIG. 4 shows a portion of a steel piston rod 502 sectioned to show that it has a circular cross-section interrupted at six peripheral locations by alignment recesses 503. Each alignment recess is a groove of uniform circular arc cross-section, extending in the axial direction along the rod 502. The six grooves are, in this embodiment, arranged as three pairs spaced regularly i.e. at 120°. The radius of the rod 502 is e.g. 2 to 3 cm.

FIG. 5 shows the rod installed as a piston rod in the cylindrical bore 501 of a cylinder housing e.g. part of a pneumatically-driven robot arm construction in which the rod 502 carries a controllable implement. Near its external opening, the bore 501 has inwardly projecting circular-section lugs 505 which engage the corresponding groove 503 of the rod and prevent the rod from rotating about its own axis relative to the bore 501, while permitting it to slide in the axial direction.

Additional elements such as wiper seals are not shown, for simplicity's sake.

An elastomeric sealing O-ring 504 is seated in a cylindrically-walled annular recess of the bore 501 at the gland, sealing against the rod 502 by an inner sealing lip 508 and against the wall of its seating recess 506 by an outer sealing lip 507.

As seen on the right of FIG. 5, the seal 504 is radially thicker at the groove 503 than at the plain portions of the rod, so that a sealing lip portion 508*b* projects further into the bore and into the groove 503 than the part of the sealing lip 508*a* sealing against the plain surface. The projecting portion is projected against extrusion by support from the lug 505.

The conformation of the seal is shown in detail in FIGS. 6 to 9.

Referring generally to FIGS. 6 to 9, the radially inwardly directed surface is substantially cylindrical on the low-pressure side at the support body 517 or "heel" of the seal, which is solid in cross-section.

From the solid support portion 517—which is about half the axial extent of the sealing ring—the inner surface has the sealing lip 508 formed firstly by an inwardly tapering slope 519 and secondly by an axially short cylindrical lip extremity 520 at the radially inmost part, which is at the high-pressure side of the ring.

A "flat" lip is usual in pneumatic seals: for a hydraulic seal a sharp edge at the dynamic seal is more usual, On the radially outward face, the outer sealing lip 507 is likewise formed by an outwardly tapering portion 521, as in the previous embodiments.

The inwardly-directed surface has three pairs of inwardly projecting nibs 540, disposed in the same layout as the grooves 503 of the rod 502 so as to engage and seal those grooves. As can be seen from FIGS. 6 to 9, the nibs 540 have the cross-section of a circular arc. They have a non-sealing portion 541 as a bulge of the support body 517, an inwardly tapering portion 542 as a bulge on the inward taper 519 of the sealing lip 508, and a sectionally flat extremity 543 in register with the flat edge 520 of the sealing lip 508. That is, each nib 540 represents an inward bulge of the entire inner surface conformation.

The annular slot 530 extends right around the ring with uniform cross-section. As seen best in FIG. 8, it extends in from the end surface 525 for approximately half the axial thickness of the sealing ring. Radially, it is disposed nearer to the inner surface than the outer although at the nibs 540 it is more nearly half-way.

The shape of the slot 530 is generally similar to the previous embodiments. In particular, the width "a" of the slot 530 is less than the sum of the distances "b" and "c" by which the inner and Outer sealing lips 508,507 project radially beyond the non-sealing surfaces of the seal support portion 517.

The proximity of the slot 530 to the inner lip reduces the force required to flex the slot shut, and hence keeps friction low.

The closing of the slot, and hence in effect the presence of solid rubber through the thickness of the seal at the sealing lip location, provides a "positive squeeze" behind the sealing lips which, we find, can give relatively good sealing even at the very difficult angled locations at the edges of the grooves 502. The seal dimensions are selected so that the slot does not merely close, but is positively squeezed in the closed condition.

Figure 8A:
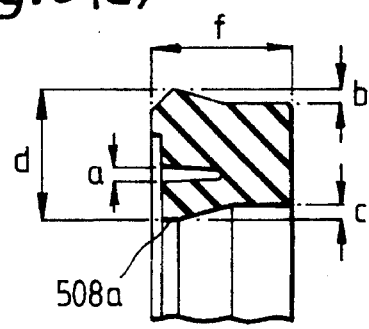
FIG. 8(a) shows, relatively enlarged, the section at the top of FIG. 7.
Figure 9:
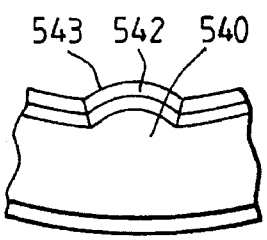
FIG. 9 is a fragmentary view in the direction of arrow "B" of FIG. 8(b), i.e. from the opposite axial side compared to FIG. 6.

In the specific embodiment shown, suitable dimensions are as follows. Seal diameter: about 5 cm. With reference to FIG. 8(a), the sealing lip extensions "b" and "c" are each about 0.7 mm, the radial seal thickness "d" about 6 mm, axial seal thickness "f" about 7 mm and the radial width "a" of the slot 530 about 0.8 mm.

Figure 8B:
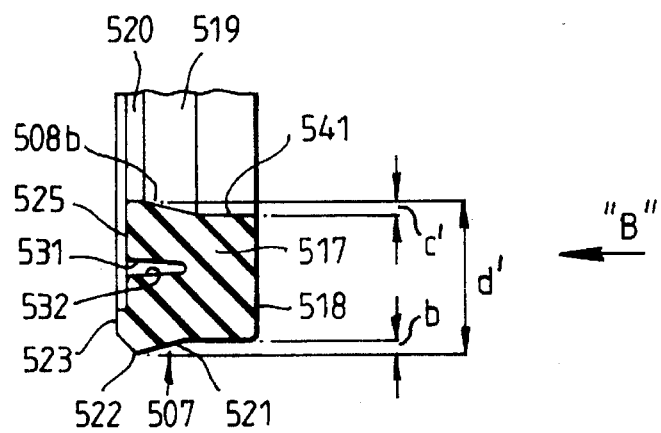
FIG. 8(b) shows, relatively enlarged, the section at the bottom of FIG. 7.

At the location of one of the nibs 540 (FIG. 8(b)) the radial seal thickness d' increases to about 7.2 mm and the lip extension c' of the inward sealing lip 508b decreases slightly to about 0.6 mm.

It will be understood that the number, location and shape of the nibs or projections may vary according to the specific context of use. Also the sectional form of the sealing lips may vary from one application to another.

We claim:

1. A sealing ring for sealing between opposed surfaces of a bore and a rod extending axially in the bore, the sealing ring comprising a ring body of elastomeric material having oppositely axially-directed faces, a radially-inwardly directed sealing face to seal against the rod and a radially-outwardly directed sealing face to seal against the bore, the radially-inwardly directed sealing face having a circumferentially-extending inward sealing lip, projecting radially on said face by an inward lip projection distance, the radially inwardly-directed sealing face having a wiper lip in addition to and axially spaced from said inward sealing lip, and the radially outwardly-directed sealing face having a circumferentially-extending outward sealing lip, projecting radially on said face by an outward lip projection distance, the inward and outward sealing lips being adjacent a first one of the axially-directed faces of the ring body, and at least one of the sealing lips being defined by a circumferentially-extending lip edge, adjacent said first axially-directed face, and a tapering portion of the ring body leading to said lip edge on the axial side thereof remote from the first axially-directed face, and the ring body defining an internal annular closable slot, extending circumferentially between the inward and outward sealing lips, the internal slot being open at said first axially-directed face, and having radially-opposed slot walls spaced radially from one another by a mean radial width, the mean radial width being from 30% to 80% of a sum of the inward lip projection distance and the outward lip projection distance and the radially-opposed slot walls being substantially straight in axial cross-section and complementary to one another, whereby in an operational sealing condition, in which the sealing ring is radially compressed between opposed surfaces, the slot walls are pressed together in complementary contact to give bodily radial compression of the elastomeric material of the ring body in axial alignment with the sealing lips.

2. A sealing ring as claimed in claim 1 in which the slot extends around the ring body with substantially uniform radial cross-section.

3. A sealing ring as claimed in claim 1 in which the mean radial width of the internal slot is from 40% to 70% of the sum of the inward lip projection distance and the outward lip projection distance.

4. A sealing ring as claimed in claim 1 in which the internal slot has an axial depth at least twice as large as the mean radial width.

5. A sealing ring as claimed in claim 1 in which the internal slot extends axially from the first axially-directed face, behind at least 50% of the axial extent of said tapering portion.

6. A sealing ring for sealing between a bore and a rod movable axially in the bore, at least one of the bore and rod having an axially-extending surface groove engaged by a corresponding projection from the other of the bore and rod to maintain rotational alignment between them, the sealing ring consisting essentially of a ring body of elastomeric material having a radially outwardly directed face, a radially inwardly directed face and oppositely axially-directed faces, at least one of the radially directed faces engaging the one of the bore and rod which has the surface groove being a sealing face and defining a radially-projecting sealing lip extending around the sealing ring;

a circumferentially-localized protuberance of the sealing face and sealing lip for sealing engagement with the surface groove, and an internal wall defining a recess extending circumferentially therein in axial alignment with the sealing lip and behind said circumferentially-localized protuberance, the internal wall including radially-directed side faces which face one another across the recess;

the sealing ring having a free condition in which the side faces of the recess are spaced apart, such that a radial compression of the sealing ring at the sealing lip causes said side faces to approach one another, and an operational sealing condition in which the sealing ring is radially compressed between opposed surfaces, with the protuberance engaging sealingly in the surface groove and the side faces of the recess pressed together in contact to compress the elastomeric material of the ring body in axial alignment with the sealing lip.

7. A sealing ring as claimed in claim 6 in which the protuberance has, in radial cross-section, an arcuate outline intersecting the adjacent parts of the sealing lip at sharp corners.

8. A sealing ring as claimed in claim 6 wherein a plurality of said protuberances are distributed around the ring body, for sealing engagement in use in respective ones of a plurality of surface grooves.

9. A sealing ring as claimed in claim 6 in which the radially inwardly and outwardly directed faces are sealing surfaces having respective said sealing lips, the sealing lips being substantially axially aligned with one another and the recess being between them, each said sealing lip projecting radially on a respective face by a lip projection distance, the recess having a mean radial width, and the mean radial width of the recess being from 30% to 80% of a sum of the lip projection distances.

10. A sealing ring as claimed in claim 9 in which the recess is a slot having a mean radial width, said slot being open at an axially-directed face of the ring body and having an axial depth at least twice as large as the mean radial width.

11. A sealing ring as claimed in claim 10 in which the side faces of the recess are parallel.

12. A sealed assembly comprising a rod, a bore, and a sealing ring sealing between the rod and bore, the rod and bore being relatively axially movable, the sealing ring comprising:

a ring body of elastomeric material having oppositely axially-directed faces, a radially-inwardly directed sealing face to seal against the rod and a radially-outwardly directed sealing face to seal against the bore, the radially-inwardly directed sealing face having a circumferentially-extending inward sealing lip, projecting radially on said face by an inward lip projection distance, the radially inwardly-directed sealing face having a wiper lip in addition to and axially spaced from said inward sealing lip the wider lip contacting the rod, and the radially outwardly-directed sealing face having a circumferentially-extending outward sealing lip, projecting radially on said face by an outward lip projection distance, the inward and outward sealing lips being adjacent a first one of the axially-directed faces of the ring body, and at least one of the sealing lips being defined by a circumferentially-extending lip edge adjacent said first axially-directed face, a tapering portion of the ring body leading to said lip edge on the axial side thereof remote from the first axially-directed face, and the ring body defining an internal annular closable slot, extending circumferentially between the inward and outward sealing lips, opening at said first axially-directed face, and having radially-opposed slot walls spaced radially from one another by a mean radial width, the mean radial width being from 30% to 80% of the sum of the inward lip projection distance and the outward lip projection distance and the radially-opposed recess walls being substantially straight in axial cross-section and complementary to one another, whereby in an operational sealing condition in which the sealing ring is radially compressed between opposed surfaces, the slot walls are pressed together in complementary contact to give bodily radial compression of the elastomeric material of the ring body in axial alignment with the sealing lips.

13. A sealed assembly according to claim 12 in which the bore has an annular seating recess in which the sealing ring is seated, the radially-inward directed sealing face of the ring body sealing against the relatively movable axially-smooth surface of the rod.

14. A sealed assembly comprising a bore and rod in the bore, the rod and bore being relatively axially movable under the influence of fluid pressure, one of the rod and bore having at least one axially-extending surface groove, and the other of the rod and bore having a projection engaging in said surface groove to maintain relative rotational orientation of the bore and rod, and a sealing ring seated in an annular seating recess of that one of the bore and rod having the projection, the sealing ring consisting essentially of a ring body of elastomeric material having a radially outwardly directed face, a radially inwardly directed face and oppositely axially-directed faces, at least that one of the radially directed faces for engaging that one of the bore and rod which has the surface groove being a sealing face and defining a radially-projecting sealing lip extending around the sealing ring;

a circumferentially-localized protuberance of the sealing face and sealing lip engaging sealingly in the surface groove, and the elastomeric body further having an internal wall defining a recess extending circumferentially therein in axial alignment with the sealing lip and behind said circumferentially-localized protuberance, the internal wall including radially-directed side faces which face one another across the recess;

the sealing ring being radially compressed between opposed surfaces of the rod and bore, with the protuberance engaging sealingly in the surface groove and the side faces of the recess pressed together in contact to compress the elastomeric material of the ring body in axial alignment with the sealing lip.

15. A sealed assembly as claimed in claim 14 in which the rod has the surface groove.

16. A sealed assembly as claimed in claim 14 further including a plurality of surface grooves circumferentially distributed, and the sealing face and sealing lip of the sealing ring have a corresponding plurality of protuberances in sealing engagement therein.

* * * * *